Nov. 29, 1960  R. D. MITCHELL  2,961,817
DRAG RAKE FOR CUTTING AND RAKING UNDERWATER GROWTH
Filed Nov. 19, 1958  2 Sheets-Sheet 2
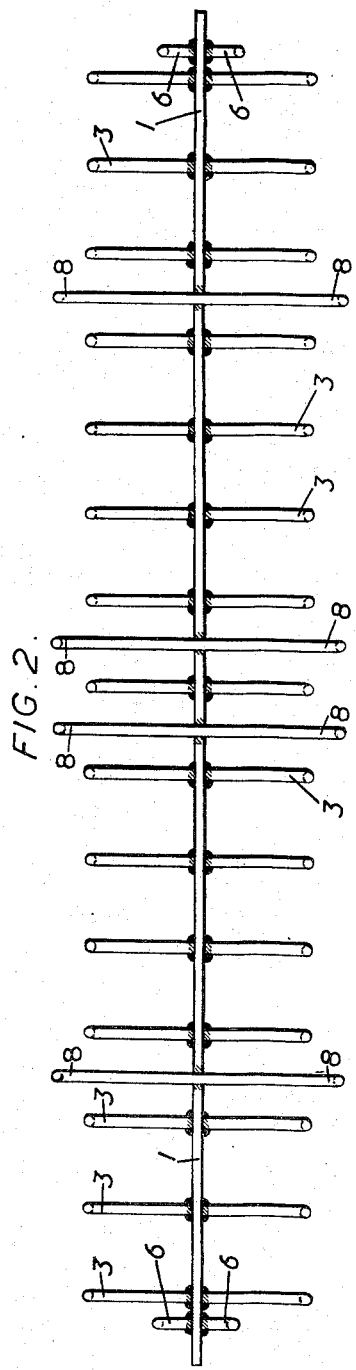
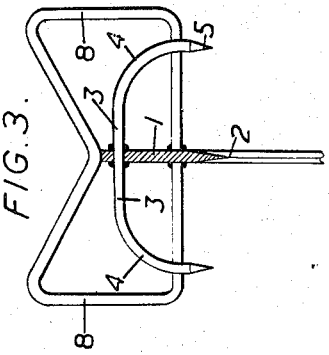
Inventor
RUTH DAPHNE MITCHELL
By William R. Lieberman
Attorney 2,961,817

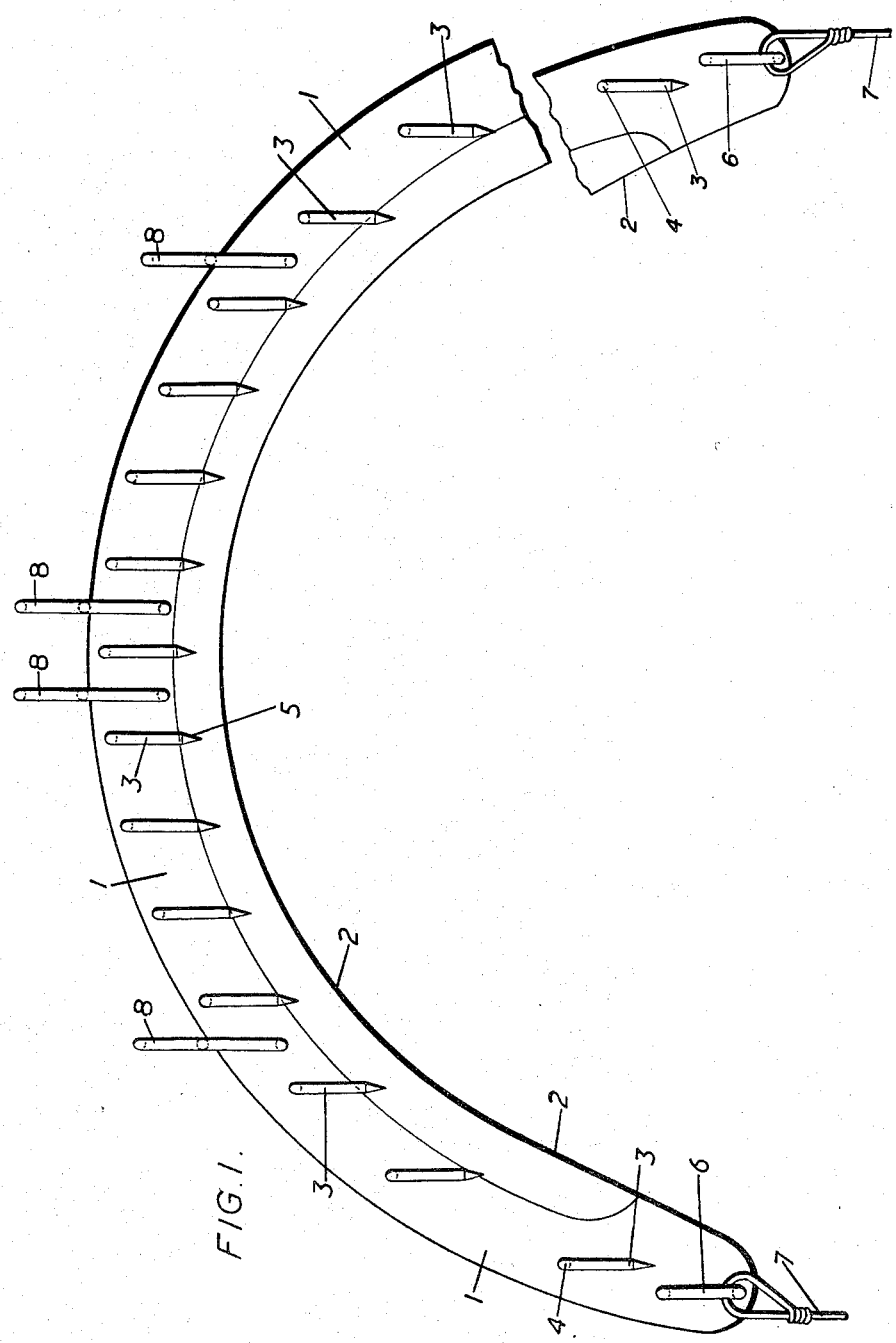

DRAG RAKE FOR CUTTING AND RAKING UNDERWATER GROWTH

Ruth D. Mitchell, Stand 6252, Pise de Terre, Jameson Ave., Salisbury, Southern Rhodesia Filed Nov. 19, 1958, Ser. No. 774,904

Claims priority, application Federation of Rhodesia and Nyasaland July 28, 1958

2 Claims. (Cl. 56—8)

This invention relates to rakes suitable for raking and cutting underwater growth such as weeds, grass or rushes by being dragged along the bottom of a lake, river or stream. It provides for the simultaneous weeding and cutting of underwater vegetation which tends to foul fisherman's lines or the propellers and rudders of marine craft. Alternatively the device could be used in land clearing by being pulled along the ground in the same manner.

According to the invention the device comprises a semi-circular flat metal blade having a sharpened cutting edge on the inside profile with metal spikes or tines protruding above and below the flat portions of the blade and has interspaced between said metal spikes four or more metal runners.

The semi-circular metal blade may comprise a substantially flat piece of steel with the internal profile suitably machined and ground to form a sharp cutting edge, the flat face of the blade drilled and/or tapped at suitable intervals to take the metal spikes or tines and runners, provision being made at each end of the flat blade for the attachment of tow ropes, steel cables or the like.

The metal spikes or tines may be formed at each end in a 90° bend and are welded or screwed into the drilled or tapped apertures provided in the flat metal blade in such a way that the sharpened ends of the spikes or tines face towards the cutting edge of the said blade, the spikes or tines top and bottom being complementary to one another.

The metal runners which are longer than the metal spikes or tines may be of rectangular shape with a slight curvature at each of the four corners and may be located with one pair of runners on each side of the centre portion of the blade and a further runner near each end of the blade, the said runners when fitted to the blade being well above height of the spikes or tines and sited aft of the sharp end of each spike or tine.

To operate the device, the rake is dragged along the bottom of the area to be cleared by means of the cables attached to each end of the blade; where an obstruction is encountered one of the cables is slackened off and the blade moves sideways towards the taut cable thus moving free of the obstacle. The use of two cables also permits the blade to be dragged from side to side giving a cutting motion to the blade.

The fitting of tines or spikes to both sides of the blade ensures that no matter which side the blade is resting it will continue to operate satisfactorily. The leading edges of the tines present a sharp edge.

In order that the invention may be made more clearly understood, an example of the invention is now described with reference to the accompanying drawings, in which:

Figure 1 is a plan view of the device; and

Figure 2 is a front elevation of the device; and

Figure 3 is a side elevation of the device, with the blade being shown in section.

In the drawings, the flat metal blade 1 is provided with a sharp cutting edge 2. The blade 1 is provided on both sides with tines or spikes 3, each tine 3 projecting from the blade 1 and being bent at 4 into a right angle, the ends of the tines being sharpened to a point 5 facing generally towards the cutting edge 2.

The ends of the blade 1 are provided with loops 6 to which are attached cords 7 by which the device is pulled across the bed of a dam or river.

The blade 1 is also provided with runners 8 which enable the rake to be dragged across the bed of the dam or river with the tines 3 kept clear of the ground. This is to prevent the tines 3 from digging into the ground and jamming the rake.

In operation the cutting edge 2 cuts the weeds which are gathered by the tines 3, which will also collect any dead weeds or growth which may be lying on the bottom of the dam or river.

I claim:

1. A drag rake comprising a generally curved flat blade, the concave leading edge of which is sharpened, a plurality of tines on said blade projecting upwardly therefrom and at right angles thereto and a plurality of tines on said blades projecting downwardly therefrom and at right angles thereto, the free ends of the tines being pointed and bent over into parallelism with the blade.

2. A rake comprising a generally flat, curved blade, the inner edge of which is sharpened, a plurality of tines secured to and projecting from both sides of the blade and at right angles thereto, the free ends of the tines being pointed and bent over into parallelism with the blade, and a plurality of skid runners secured to both sides of the blades, and extending beyond the plane of the tines on both sides thereof.

References Cited in the file of this patent

UNITED STATES PATENTS

| 1,043,758 | Ferwerda | Nov. 5, 1912 |
| 2,684,549 | Olden | July 27, 1954 |
| 2,864,225 | Williams | Dec. 16, 1958 |

FOREIGN PATENTS

| 18,705 | Great Britain | 1894 |
| 667,244 | Great Britain | Feb. 27, 1952 |